United States Patent [19]

Kelham

[11] Patent Number: 5,087,335

[45] Date of Patent: Feb. 11, 1992

[54] PROCESS FOR COOLING OF GASEOUS CHLORINE

[75] Inventor: Stephen F. Kelham, Appleton, England

[73] Assignee: Imperial Chemical Industries plc, London, England

[21] Appl. No.: 409,211

[22] Filed: Sep. 19, 1989

[30] Foreign Application Priority Data

Sep. 19, 1988 [GB] United Kingdom ............... 8821927

[51] Int. Cl.$^5$ ................................................ C25B 1/26
[52] U.S. Cl. ................................. 204/128; 23/293 R; 62/20; 62/121
[58] Field of Search .................. 204/128; 23/293 R; 62/20, 121; 261/113, 114.1, 117

[56] References Cited

U.S. PATENT DOCUMENTS

| | | | |
|---|---|---|---|
| 3,434,948 | 3/1969 | Hooker et al. | 204/128 |
| 4,105,515 | 8/1978 | Ogawa et al. | 204/98 |

OTHER PUBLICATIONS

Patents Abstracts of Japan, vol. 5, No. 168 (C-77), (840), Oct. 27, 1981.

*Primary Examiner*—John Niebling
*Assistant Examiner*—Kathryn Gorgos
*Attorney, Agent, or Firm*—Cushman, Darby & Cushman

[57] ABSTRACT

A process for cooling gaseous chlorine in which gaseous chlorine at elevated temperature and at a pressure of greater than 0.5 bar gauge, for example, up to 12 bar gauge, is cooled by directly contacting the gaseous chlorine with an aqueous solution of a solute, for example, with an aqueous alkali metal chloride solution from which chlorine may be produced by electrolysis.

10 Claims, No Drawings

PROCESS FOR COOLING OF GASEOUS CHLORINE

BACKGROUND OF THE INVENTION

1. Technical Field

This invention relates to a process for the cooling of gaseous chlorine from elevated temperatures, particularly to the cooling of gaseous chlorine which has been produced electrolytically.

2. BACKGROUND INFORMATION

Chlorine may be produced by the electrolysis of a number of different electrolytes, for example by the electrolysis of an aqueous solution of hydrogen chloride. However, it is generally produced by the electrolysis of an aqueous solution of an alkali metal chloride, particularly sodium chloride, and it is produced on a vast scale throughout the world by the electrolysis of such a solution.

The production of chlorine by the electrolysis of aqueous alkali metal chloride solution may be effected in a variety of different types of electrolytic cells. Thus, the electrolysis may be effected in a cell equipped with graphite or metal anodes and a flowing mercury cathode, chlorine being evolved at the anodes and the sodium which is liberated in the electrolysis reacting with the mercury cathode to form an alkali metal amalgam which is subsequently reacted with water to form an alkali metal hydroxide solution and hydrogen.

Where aqueous alkali metal chloride solution is electrolyzed in an electrolytic cell of the diaphragm type, the solution is charged to the anode compartments of the cell, chlorine which is produced in the electrolysis is removed from the anode compartments of the cell, the alkali metal chloride solution passes through the diaphragms, and hydrogen and alkali metal hydroxide produced by electrolysis are removed from the cathode compartments; the alkali metal hydroxide being removed in the form of an aqueous solution of alkali metal chloride and alkali metal hydroxide.

Where an aqueous alkali metal chloride solution is electrolyzed in an electrolytic cell of the membrane type the solution is charged to the anode compartments of the cell, and chlorine produced in the electrolysis and depleted alkali metal chloride solution are removed from the anode compartments, alkali metal ions are transported across the membranes to the cathode compartments of the cell to which water of dilute alkali metal hydroxide solution may be charged, and hydrogen and alkali metal hydroxide solution produced by the reaction of alkali metal ions with water are removed from the cathode compartments of the cell.

All such electrolyses are operated at elevated temperatures, for example, at a temperature near to the boiling point of the electrolyte, eg at a temperature of the order of 90° C. or even higher, as the efficiency of the electrolysis is greater at such elevated temperatures. The products of electrolysis are necessarily produced at the same temperature at which the electrolysis is effected, and it is necessary to cool the products prior to storage and use. In particular, it is necessary to cool the gaseous products of electrolysis. In the case of gaseous chlorine, cooling is necessary in order than the chlorine may be liquefied by compression, and it has been the practice hitherto to cool electrolytically produced gaseous chlorine by directly contacting the chlorine with water in a packed tower or scrubber, although cooling may be effected by indirectly contacting the chlorine with water.

Cooling of gaseous chlorine by directly contacting the chlorine with water requires the provision of large amounts of cooling water, and furthermore, direct contact between gaseous chlorine and cooling water results in the gaseous chlorine becoming saturated with water vapor at a pressure equivalent to the water vapor pressure at the temperature of the cooling water. The gaseous chlorine may also be mixed with liquid water in the form of a mist. It is necessary to remove this water vapor and mist of liquid water from the gaseous chlorine, particularly if the chlorine is to be liquefied by compression, and it has been normal practice hitherto to remove liquid water in the form of a mist by passing the chlorine through a filter, e.g. a fiber filter, and to remove water vapor by contacting the chlorine with a drying medium, eg sulphuric acid. A large amount of such a drying medium is required in order to dry the gaseous chlorine.

In GB Patent 1 125 453, there is described a process in which;gaseous chlorine which has been produced electrolytically is cooled by heat exchange with the electrolyte before the electrolyte is charged to the electrolytic cell. The electrolyte which is charged to the electrolytic cell may be an aqueous alkali metal chloride solution, and the heat exchange may be effected by directly contacting the gaseous chlorine with the electrolyte. By operating such a process, the amount of cooling liquid which is required is much reduced; indeed, the need for cooling water may be eliminated, and furthermore, the heat exchange results in the electrolyte being at least partially heated to the required temperature, thus, eliminating the need for at least some of the heating which has been required hitherto.

Direct contact between gaseous chlorine and the electrolyte which is to be charged to the electrolytic cell also provides a further benefit. As the vapor pressure of water over an aqueous solution, such as the electrolyte, is lower than the vapor pressure over water per se at a given temperature the amount of water vapor present in gaseous chlorine which has been cooled by direct contact with such a solution is lower than the amount of water vapor present in gaseous chlorine which has been contacted with water itself. Consequently, the amount of water which must be removed from the cooled gaseous chlorine by drying is correspondingly reduced, and the amount of drying medium which is required is also reduced.

Although chlorine is generally produced electrolytically at a pressure slightly below atmospheric pressure in recent years, proposals have been made to produce chlorine at an elevated pressure. For example, in GB Patent 1 547 062, there is described a process for the electrolysis of an aqueous alkali metal halide solution in a membrane cell in which the pressure in the cell is maintained at a value greater than atmospheric but not greater than 7kg cm$^{-2}$ (absolute). Production of chlorine at an elevated pressure is advantageous in that the need for some at least of the compression of the chlorine which is subsequently required in order to liquefy the chlorine prior to storage or use is eliminated.

SUMMARY OF THE INVENTION

The present invention is based on the observation that cooling of gaseous chlorine by direct contact with an aqueous solution of a solute, such as the electrolyte which is to be charged to the cell and from which the chlorine is produced by electrolysis, rather than by direct contact with water per se, provides an additional and most unexpected benefit when the gaseous chlorine is at elevated pressure. Thus, when gaseous chlorine is cooled by directly contacting the chlorine with water, chlorine hydrate can be produced. The formation of chlorine hydrate is most undesirable as it is a solid which may be precipitated from the cooling water and lead to blockages in the plant and equipment. For example, at a chlorine gas pressure of 4 bar gauge, chlorine hydrate is produced when gaseous chlorine is directly contacted with water when the temperature falls below 23.5. As it may well be desired to cool the gaseous chlorine to a temperature below 23.5 to facilitate liquefaction and to reduce the amount of water vapor which must be removed from the chlorine by drying, there is a high probability of chlorine hydrate being produced when gaseous chlorine is cooled by direct contact with water. On the other hand, when gaseous chlorine is directly contacted with a 20 weight percent aqueous sodium chloride solution at the same pressure, chlorine hydrate is formed only when the temperature falls below 14° C. and the possibility of producing the undesirable chlorine hydrate is very much reduced. When gaseous chlorine is directly contacted with water at a higher pressure, there may be a tendency for the chlorine to be condensed as a liquid. Thus, at a pressure of 7.5 bar gauge, liquid chlorine and chlorine hydrate is formed on contact with cooling water at a temperature below 28° C. but on contact with a 20 weight percent aqueous sodium chloride solution, chlorine hydrate in combination with liquid chlorine is formed only when the temperature falls below 20° C.

DETAILED DESCRIPTION OF THE INVENTION

According to the present invention there is provided a process for cooling gaseous chlorine in which gaseous chlorine at an elevated temperature and at a pressure of greater than 0.5 bar gauge is cooled by directly contacting the gaseous chlorine with an aqueous solution of a solute.

The process of the present invention relates to the cooling of gaseous chlorine, however, the gaseous chlorine is produced. However, it will generally be produced electrolytically, for example, by the electrolysis of an aqueous alkali metal chloride solution, although the chlorine may be produced by electrolysis of any suitable electrolyte, e.g. aqueous hydrogen chloride solution. The chlorine may be produced in any suitable type of electrolytic cell, but it is preferred that the chlorine is produced in an electrolytic cell of the membrane type, for example, a cell equipped with cation-exchange membranes, as an electrolytic cell of this type is particularly suited for operation at elevated pressure.

Gaseous chlorine may be cooled by directly contacting the chlorine with an aqueous solution of any suitable solute. However, it is particularly convenient to effect the cooling by directly contacting the gaseous chlorine with an aqueous solution of an electrolyte, eg an aqueous alkali metal chloride solution from which the chlorine is produced electrolytically, contact being effected prior to the solution being charged to the electrolytic cell. Operation of the process of the invention in this way then effects some at least of the desired cooling of the gaseous chlorine, and simultaneously some at least of the heating of the solution which is necessary prior to electrolysis of the solution being effected. Furthermore, chlorine which is dissolved in the cooling liquid does not need to be separately recovered as it is passed to the electrolytic cell together with the aqueous electrolyte solution.

The temperature of the solution will, of course, be below that of the gaseous chlorine which is cooled by direct contact with the solution. A suitable temperature is around ambient temperature, e.g. 25° C., although the temperature of the solution may be higher, or lower.

The greater is the concentration of the solute in the aqueous solution with which the gaseous chlorine is contacted the lower is the water vapor pressure over the solution at a given temperature, and the lower is the amount of water vapor in the gaseous chlorine after direct contact with the solution has been effected, and the lower is the amount of water which must subsequently be removed from the gaseous chlorine by drying. For this reason, it is preferred that a high concentration of solute be present in the aqueous solution, and preferably, the concentration of solute is at least 10% by weight, more preferably at least 20% by weight. The solution is suitably a saturated solution.

By way of example the vapor pressure over water per se at 25° C. is 23.9mm whereas the vapor pressure of water over a 25% by weight aqueous solution of sodium chloride is only 18.5 mm. The presence of the sodium chloride in the aqueous solution results in an decrease of water vapor pressure of 23% and cooling gaseous chlorine to 25° C. by directly contacting the chlorine with such a solution results in a corresponding decrease in the amount of water vapor in the cooled chlorine compared with that which would have been present in the chlorine had the chlorine been cooled to the same temperature by directly contacting the gaseous chlorine with water.

For the reasons stated above, it is preferred, where the chlorine is produced by electrolysis of aqueous alkali metal chloride solution, that the solution be a saturated solution, or a solution which is substantially saturated.

The pressure of the gaseous chlorine which is produced in the process of the invention may vary over a wide range. The pressure of the gaseous chlorine may be the same as that at which the chlorine is produced, eg in an electrolytic cell. Alternatively, the pressure of the gaseous chlorine as produced may be increased prior to cooling of the gaseous chlorine in the process of the invention. For example, the pressure of gaseous chlorine may be greater than 1 bar gauge, and it may be at a pressure of up to 10 bar gauge or 12 bar gauge or more. The chlorine may remain in a gaseous state at the temperature to which it is cooled in the process of the invention. Alternatively, the gaseous chlorine may be at such a pressure that when cooled in the process of the invention it is liquified. The pressure of the gaseous chlorine will generally not be greater than 12, preferably not greater than 10, bar gauge. In practice, an upper limit may also be placed on the pressure of the gaseous chlorine by the maximum pressure at which the electrolytic cell is able to operate.

The temperature of the gaseous chlorine which is initially directly contacted with an aqueous solution in the process of the invention will generally be about the same as that at which the chlorine is produced, eg produced electrolytically, for example about 90° C.

When the gaseous chlorine which is cooled in the process of the invention is to be liquefied it is desirable that the chlorine be cooled to as low a temperature as possible provided that the chlorine is not cooled to a temperature at which chlorine hydrate is formed. Furthermore, it may also be desirable that when the gaseous chlorine is in contact with the aqueous solution it is not cooled to a temperature at which the chlorine liquefies.

The temperature to which the chlorine may be cooled by direct contact with the aqueous solution will depend on the pressure of the gaseous chlorine and on the concentration of the solute in the aqueous solution, but in general, the chlorine will be cooled to a temperature of not greater than 30° C., preferably a temperature of not greater than 20° C.

The process of the invention may be effected in any suitable vessel in which the gaseous chlorine may be contacted directly with an aqueous solution of a solute. For example, the gaseous chlorine may be contacted with the solution in a scrubber or in a packed column of the types which have been used hitherto to cool chlorine by direct contact with water and further description of suitable vessels is not necessary, although some simple adaptation of the vessels may be required in order that they may operate at elevated pressure.

DESCRIPTION OF THE PREFERRED EMBODIMENT

In a preferred embodiment of the invention, direct contact between a stream of gaseous chlorine and the aqueous solution is effected in a counter current manner. For example, contact between a stream of gaseous chlorine and the aqueous solution may be effected progressively in a plurality of vessels with the gaseous chlorine and the aqueous solution flowing through the plurality of vessels in a counter current manner. In this way, the temperature of the gaseous chlorine may be progressively decreased, and the temperature of the aqueous solution may be progressively increased such that, for example where the aqueous solution is an aqueous alkali metal chloride solution, the temperature of the solution which issues from the final vessel in the series is at or near to that required in the solution which is to be electrolysed in an electrolytic cell.

The gaseous chlorine which has been contacted directly with an aqueous solution of a solute in the process of the invention may contain some of the solution in the form of a mist, and prior to drying of the gaseous chlorine to remove water vapor, the mist of the solution may be removed from the chlorine. This mist removal may be effected in known manner, for example, by passing the gaseous chlorine through a filter, e.g. a fibrous filter.

The gaseous chlorine may be dried by contacting the chlorine with a drying medium, for example with sulphuric acid, and, if desired, the thus dried chlorine may be compressed and/or liquefied.

I claim:

1. A process for cooling gaseous chlorine in which gaseous chlorine at an elevated temperature and at a pressure of greater than 0.5 bar gauge is cooled by directly contacting the gaseous chlorine with an aqueous solution of a solute to a temperature not greater than 30° C. and above, that at which chlorine hydrate is formed at the particular pressure used in the process.

2. A process as claimed in claim 1 in which the chlorine is produced by electrolysis of aqueous alkali metal chloride solution.

3. A process as claimed in claim 2 in which the solution is electrolyzed in an electroltyic cell of the membrane type.

4. A process as claimed in any one of claims 1 to 3 in which the gaseous chlorine is directly contacted with an aqueous alkali metal chloride solution.

5. A process as claimed in claim 4 in which direct contact is effected between gaseous chlorine and aqueous alkali metal chloride solution prior to electrolysis of the solution.

6. A process as claimed in claim 1 in which the concentration of solute in the aqueous solution is at least 10% by weight.

7. A process as claimed in claim 6 in which the solution is a substantially saturated solution.

8. A process as claimed in claim 1 in which the pressure of gaseous chlorine is greater than 1 bar gauge.

9. A process as claimed in claim 8 in which the pressure of gaseous chlorine is up to 10 bar gauge.

10. A process as claimed in claims 1 in which direct contact between gaseous chlorine and an aqueous solution of a solute is effected in a counter current manner.

* * * * *